United States Patent
Cakallik et al.

(10) Patent No.: US 10,364,768 B2
(45) Date of Patent: Jul. 30, 2019

(54) METHOD FOR OPERATING AN ARRANGEMENT FOR USING WASTE HEAT

(71) Applicant: Robert Bosch GmbH, Stuttgart (DE)

(72) Inventors: Derya Cakallik, Rutesheim (DE); Marc Oliver Roehner, Heidelberg (DE); Maren Matter, Stuttgart (DE); Markus Viereck, Stuttgart (DE); Matthew Thorington, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 135 days.

(21) Appl. No.: 15/532,609

(22) PCT Filed: Oct. 8, 2015

(86) PCT No.: PCT/EP2015/073303
§ 371 (c)(1),
(2) Date: Jun. 2, 2017

(87) PCT Pub. No.: WO2016/087096
PCT Pub. Date: Jun. 9, 2016

(65) Prior Publication Data
US 2017/0335783 A1    Nov. 23, 2017

(30) Foreign Application Priority Data

Dec. 5, 2014   (DE) .................. 10 2014 225 059

(51) Int. Cl.
*F02D 41/22* (2006.01)
*F02G 5/02* (2006.01)
(Continued)

(52) U.S. Cl.
CPC ............ *F02D 41/22* (2013.01); *F01K 23/065* (2013.01); *F01K 23/101* (2013.01); *F02G 5/02* (2013.01);
(Continued)

(58) Field of Classification Search
CPC combination set(s) only.
See application file for complete search history.

(56) References Cited

U.S. PATENT DOCUMENTS 8,151,779 B1 *   4/2012   Hagiwara ............... F02B 43/10
                                                          123/575
2003/0145583 A1 *   8/2003   Tanaka .................... F01K 23/10
                                                          60/298
(Continued)

FOREIGN PATENT DOCUMENTS

| AT | 513205 | 2/2014 |
|---|---|---|
| DE | 102011076405 | 11/2012 |
| DE | 102012221153 | 6/2014 |

OTHER PUBLICATIONS

Machine translation of DE 10201222153A1, 2012 (Year: 2012).*
(Continued)

*Primary Examiner* — Long T Tran
(74) *Attorney, Agent, or Firm* — Michael Best & Friedrich LLP (57) ABSTRACT

Method for operating an arrangement for using waste heat of an internal combustion engine, wherein the internal combustion engine has an exhaust gas duct and the arrangement for using waste heat has a circuit conveying a working medium. In the circuit are arranged, in the flow direction of the working medium, a pump, at least one evaporator, an expansion machine and a condenser. The at least one evaporator is also arranged in the exhaust gas duct, wherein in the at least one evaporator an exhaust gas expelled from the internal combustion engine is used as a heat source, and thus the working medium is evaporated in the evaporator. The method according to the invention detects, inside the at least one evaporator, a leakage of the working medium into the exhaust gas duct.

14 Claims, 3 Drawing Sheets

(51) Int. Cl.
    *F01K 23/06*     (2006.01)
    *F01K 23/10*     (2006.01)
    *F22B 1/18*     (2006.01)
    *F02M 65/00*     (2006.01)
    *F02M 63/02*     (2006.01)

(52) U.S. Cl.
CPC ......... *F02M 65/006* (2013.01); *F22B 1/1807* (2013.01); *F02D 2041/225* (2013.01); *F02D 2200/0606* (2013.01); *F02M 63/023* (2013.01); *F02M 2200/248* (2013.01); *Y02E 20/363* (2013.01); *Y02T 10/16* (2013.01)

(56) References Cited

U.S. PATENT DOCUMENTS

| | | | |
|---|---|---|---|
| 2013/0327133 A1* | 12/2013 | Yamashita | F01K 23/065 73/114.68 |
| 2014/0165558 A1* | 6/2014 | Birgler | F02B 47/08 60/605.1 |
| 2016/0153317 A1* | 6/2016 | Geskes | F01K 23/065 60/618 |
| 2016/0178260 A1* | 6/2016 | Geskes | F28F 3/005 62/129 |

OTHER PUBLICATIONS

International Search Report for Application No. PCT/EP2015/073303 dated Dec. 22, 2015 (English Translation, 2 pages).

* cited by examiner

METHOD FOR OPERATING AN ARRANGEMENT FOR USING WASTE HEAT

BACKGROUND OF THE INVENTION

The invention relates to a method for operating an arrangement for using waste heat, wherein, according to the invention, leakage of a working medium into an exhaust gas channel is determined.

Arrangements for using waste heat of internal combustion engines are known from the prior art, such as, for example, from laid-open application DE 10 2011 076 405 A1. The known arrangement for using waste heat comprises a circuit conducting a working medium, wherein a pump, an evaporator, an expansion machine and a condenser are arranged in the direction of flow of the working medium in the circuit. The evaporator is also arranged in an exhaust gas channel of the internal combustion engine such that said evaporator can use an exhaust gas output by the internal combustion engine as a heat source.

In the known method for operating an arrangement for using waste heat, it is disclosed that leakage of the evaporated working medium can occur in the evaporator. The leakage firstly leads to a large demand for working medium and, secondly, undesirable effects, such as, for example, uncontrolled combustion of the working medium, can occur.

SUMMARY OF THE INVENTION

The method according to the invention is now intended to improve the determination of the leakage of the working medium, wherein it is intended to detect a leakage of both liquid and evaporated working medium, and, in developments, also to take into consideration a return channel of the exhaust gas, in which the evaporator or a further evaporator is arranged. The method according to the invention for operating an arrangement for using waste heat of an internal combustion engine accordingly has significantly improved determination of the leakage of the working medium, wherein the leakage in an evaporator of the arrangement for using waste heat into the exhaust gas channel of the internal combustion engine is determined. The evaporator can be arranged here both in the return channel and also in an end channel of the exhaust gas channel. The indicators for determining the leakage are suitable both for liquid and for evaporated working media.

For this purpose, the internal combustion engine comprises an arrangement for using waste heat and an exhaust gas channel. The arrangement for using waste heat has a circuit conducting a working medium, wherein a pump, at least one evaporator, an expansion machine and a condenser are arranged in the direction of flow of the working medium in the circuit. The at least one evaporator is also arranged in the exhaust gas channel, wherein, in the at least one evaporator, an exhaust gas output by the internal combustion engine is used as a heat source, and the working medium is thereby evaporated in the evaporator. The method according to the invention for operating the arrangement for using waste heat determines a leakage of the working medium within the at least one evaporator into the exhaust gas channel from a measured physical value.

As a result, both a leakage of liquid and also of evaporated working medium from the at least one evaporator into the exhaust gas channel is detected.

In a development of the method, the leakage is determined by the fact that a temperature of the working medium in the circuit downstream of the at least one evaporator is measured, and said temperature is compared with a calculated temperature. As a result, only one temperature sensor is required in the circuit downstream of the evaporator. The method according to the invention can thus be realized simply and cost-effectively. If the measured temperature of the working medium downstream of the evaporator is higher than the temperature calculated for this purpose, this is an indicator of a leakage since the mass of working medium to be heated is smaller than expected or calculated and, accordingly, the same quantity of heat from the exhaust gas channel is available for less mass of working medium.

In an advantageous embodiment, the leakage is determined by the fact that a mass flow of the exhaust gas in the exhaust gas channel downstream of the at least one evaporator is measured, and said mass flow is compared with a calculated mass flow. As a result, the quantity of fluid can be directly measured by the exhaust gas channel. This is a very robust indicator for determining leakage since the mass flow is a direct variable for determining leakage. If the determined exhaust gas mass flow is greater than a value calculated for this purpose, this is an indicator of leakage since, in addition to the exhaust gas flow, working medium mass also flows through the exhaust gas channel and accordingly the overall mass flow is increased.

As an alternative, instead of the mass flow, a volumetric flow can also be measured. This applies below to all of the mass flows unless expressly precluded that a volumetric flow cannot be measured instead of the mass flow.

In an advantageous development, the exhaust gas channel has a return channel, wherein the exhaust gas in the return channel is supplied again to the internal combustion engine, and wherein the at least one evaporator is arranged in the return channel or a further evaporator is arranged in the return channel. In the method, an exhaust gas temperature in the return channel downstream of the at least one evaporator or downstream of the further evaporator is measured, and said exhaust gas temperature is compared with a calculated temperature. As a result, a leakage of the working medium can also be detected in an evaporator which is arranged in the return channel. If the measured exhaust gas temperature in the return channel downstream of the evaporator is lower than a value calculated for this purpose, this is an indicator of leakage since the comparatively hot returned exhaust gas has mixed with the comparatively cool working medium. In an alternative method, an indicator of leakage is when the measured exhaust gas temperature is higher than a value calculated for this purpose: because of the leakage, a smaller mass flow of working medium flows through the evaporator; as a result, a smaller quantity of heat than expected is extracted from the exhaust gas in the evaporator, and the temperature of the exhaust gas downstream of the evaporator is therefore higher than expected.

In an advantageous manner, a charging pressure in the return channel downstream of the at least one evaporator or downstream of the further evaporator is measured, and the charging pressure is compared with a calculated charging pressure. This is then especially an effective indicator for determining leakage if, within the evaporator, the pressure of the working medium in the circuit is significantly higher than the pressure of the exhaust gas in the return channel, and therefore a leakage in the evaporator leads to a significant pressure drop in the circuit and to a significant rise in pressure in the return channel.

In a further advantageous embodiment, the at least one evaporator or a further evaporator is arranged in the return channel, and the exhaust gas composition with respect to nitrogen oxide output and/or residual oxygen content and/or soot output and/or hydrocarbon output is measured in the exhaust gas channel downstream of the internal combustion engine. The measured exhaust gas composition is subsequently compared with a calculated exhaust gas composition. A leakage of the evaporator arranged in the return channel has an effect on the exhaust gas composition of the exhaust gas output by the internal combustion engine. In this connection, a differentiation has to be made with regard to the chemical constituents after passage through the internal combustion engine between combustible and noncombustible working media. This embodiment is particularly advantageous if the exhaust gas downstream of the internal combustion engine is in any case investigated by a sensor—for example by a lambda probe—and the chemical constituents of the working medium have an effect on the measurement results of the sensor. The lambda probe, for example, measures a residual oxygen content of the exhaust gas. If said residual oxygen content is influenced by the working medium of the leakage, the measurement results of the lambda probe can be very readily used as an indicator of a leakage within the evaporator of the return channel.

In a further advantageous embodiment, a torque of the internal combustion engine is determined, and said torque is compared with a calculated torque. If the evaporator is arranged in an end channel of the exhaust gas channel, wherein the exhaust gas in the end channel is output into the surroundings, it is then an indicator of leakage if the measured torque is smaller than the calculated torque since a smaller mass flow of working medium than calculated is expanded in the expansion machine. If, by contrast, the evaporator is arranged in the return channel, it is then an indicator of leakage if the measured torque is greater than the calculated torque, if the working medium is combustible and is ignited in the internal combustion engine, since, by the combustion of the working medium, additional energy is converted into torque.

In an advantageous manner, an evaporator is arranged in the end channel and a further evaporator is arranged in the return channel. By monitoring the torque of the internal combustion engine, the leakages both in the evaporator and in the further evaporator can then be detected with the aid of a single sensor for determining the torque of the internal combustion engine. For example, a determined torque which is greater than a value calculated for this purpose is an indicator for leakage of working medium in the further evaporator into the return channel if the working medium is subsequently combusted in the combustion chamber of the internal combustion engine. A determined torque which is smaller than a value calculated for this purpose is in turn an indicator of leakage of working medium in the evaporator into the surroundings, and therefore the power output by the expansion machine drops.

In a further advantageous embodiment, the at least one evaporator or the further evaporator is arranged in the return channel. The method according to the invention determines a rotational speed of the internal combustion engine and compares said rotational speed with a calculated rotational speed. This procedure is advantageous especially when the working medium is combustible and is combusted in the internal combustion engine. However, a differentiation has to be made here as to the stage of the compression stroke of the internal combustion engine at which the combustion takes place. If the combustion takes place at an early stage, it is then an indicator of leakage if the rotational speed of the internal combustion engine is lower than the calculated rotational speed because the combustion of the working medium has a braking effect on the internal combustion engine. If, however, the combustion takes place at a late stage, it is then an indicator of leakage if the rotational speed of the internal combustion engine is greater than the calculated rotational speed because the combustion of the working medium has an accelerating effect on the internal combustion engine. A control device preferably processes the determined data of rotational speed and combustion process. This method is highly advantageous since customarily a rotational speed sensor is used in any case and also the combustion process is monitored, and therefore the leakage determination can take place in a neutral manner in terms of cost.

In a further advantageous embodiment, the at least one evaporator or the further evaporator is arranged in the return channel. The method according to the invention determines a cylinder pressure in the combustion chamber of the internal combustion engine and compares said cylinder pressure with a calculated cylinder pressure. If the determined cylinder pressure is greater than the calculated cylinder pressure, this is an indicator of leakage if the working medium is combustible and is ignited in the internal combustion engine. This method is also neutral in terms of cost if the cylinder pressure is in any case determined.

It is applicable to all methods that a combination of the described methods leads to a more robust and more accurate detection of the leakage in the evaporator or in the two evaporators. In an advantageous manner, use is made here of the sensors which are present in any case in the internal combustion engine, in the exhaust gas channel and in the circuit: for example, a rotational speed sensor on the output shaft of the internal combustion engine, a lambda probe in the exhaust gas channel and a temperature sensor in the circuit upstream of the expansion machine.

DETAILED DESCRIPTION

Figure 1:
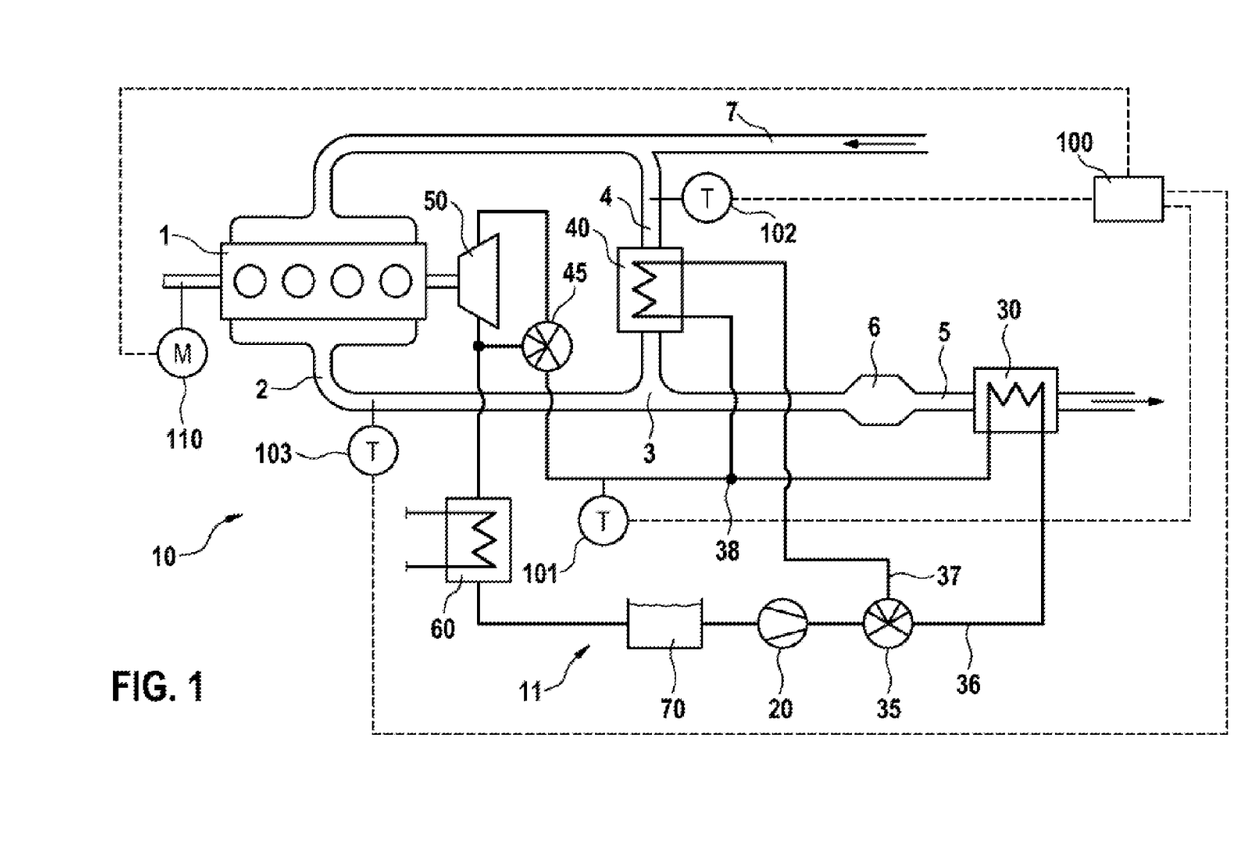
FIG. 1 shows an arrangement for using waste heat of an internal combustion engine with sensors for determining a leakage of the working medium.

FIG. 1 shows schematically an arrangement for using waste heat 10 according to the invention of an internal combustion engine 1, comprising a circuit 11 conducting a working medium.

The internal combustion engine 1 is supplied with fresh air via a fresh air channel 7. Furthermore, the internal combustion engine 1 has an exhaust gas channel 2 through which the exhaust gas is output from the internal combustion engine 1 after the combustion process. The exhaust gas channel 2 is divided at a junction point 3 into a return channel 4 and an end channel 5. At least part of the exhaust gas can be resupplied to the fresh air channel 7 via the return channel 4. The exhaust gas is output into the surroundings via the end channel 5. Diverse exhaust gas aftertreatment systems can be arranged in the end channel 5; by way of example, an exhaust gas aftertreatment system 6 is arranged here in the exemplary embodiment of FIG. 1.

The division of the exhaust gas mass flow at the junction point 3 into the return channel 4 and into the end channel 5 is carried out by a controller (not illustrated), for example a valve, and is adapted to the respective operating situation of internal combustion engine 1 and arrangement for using waste heat 10.

In the working-medium-conducting circuit 11 of the arrangement for using waste heat 10, a pump 20, an evaporator 30, a further evaporator 40, an expansion machine 50 and a condenser 60 are arranged in the direction of flow of the working medium, with the two evaporators 30, 40 being connected in parallel. A collecting container 70 for collecting the working medium is arranged between the condenser 60 and the pump 20.

The two evaporators 30, 40 are arranged both in the circuit 11 and in the exhaust gas channel 2, wherein the evaporator 30 is arranged in the end channel 5 and the further evaporator 40 is arranged in the return channel 4.

In the two evaporators 30, 40, the exhaust gas output by the internal combustion engine 1 is used as a heat source in order to evaporate the working medium in the evaporators 30, 40 therewith.

In the arrangement for using waste heat 10 of FIG. 1, the evaporator 30 and the further evaporator 40 are connected in parallel. For this purpose, the circuit 11 downstream of the pump 20 is divided at a distributor valve 35 into a first evaporator line 36 and a second evaporator line 37. The evaporator 30 is arranged in the first evaporator line 36 and the further evaporator 40 is arranged in the second evaporator line 37. Downstream of the two evaporators 30, 40, the first evaporator line 36 and the second evaporator line 37 are brought together again at a combining point 38. In alternative embodiments, the two evaporators 30, 40 can also be connected in series.

Downstream of the combining point 38, a bypass valve 45 is arranged in the circuit 11. Via the bypass valve 45, the working medium can be supplied to the expansion machine 50, or conducted past the latter and supplied directly to the condenser 60.

In the exemplary embodiment of FIG. 1, the expansion machine 50 is coupled to the internal combustion engine 1 by an output shaft. In alternative embodiments, the power output by the expansion machine 50 can, however, also be used in some other way, for example for generating current in a connected generator.

The manner of operation of the arrangement for using waste heat 10 is as follows:

The pump 20 conveys liquid working medium under pressure from the collecting container 70 via the distributor valve 35 into the evaporator 30 and/or into the further evaporator 40. The division of the working medium between the two evaporators 30, 40 is controlled here by the distributor valve 35. In the evaporators 30, 40, the working medium is ideally isobarically evaporated and subsequently supplied to the expansion machine 50. In the expansion machine 50, the gaseous working medium is expanded and thereby produces a mechanical power which can be supplied, for example, in the form of a torque to a driven shaft of the internal combustion engine. The working medium is subsequently re-liquefied in the condenser 60 and then supplied to the collecting container 70.

If the quantity of heat in the evaporators 30, 40 is not sufficient for evaporating the working medium, the working medium can be guided via the bypass valve 45 past the expansion machine 50 in order to avoid damage in the expansion machine 50. In further exemplary embodiments, the working medium can also be guided via one or more additional bypass valves past the condenser 60 and/or the collecting container 70 and/or the pump 20.

Figure 2:
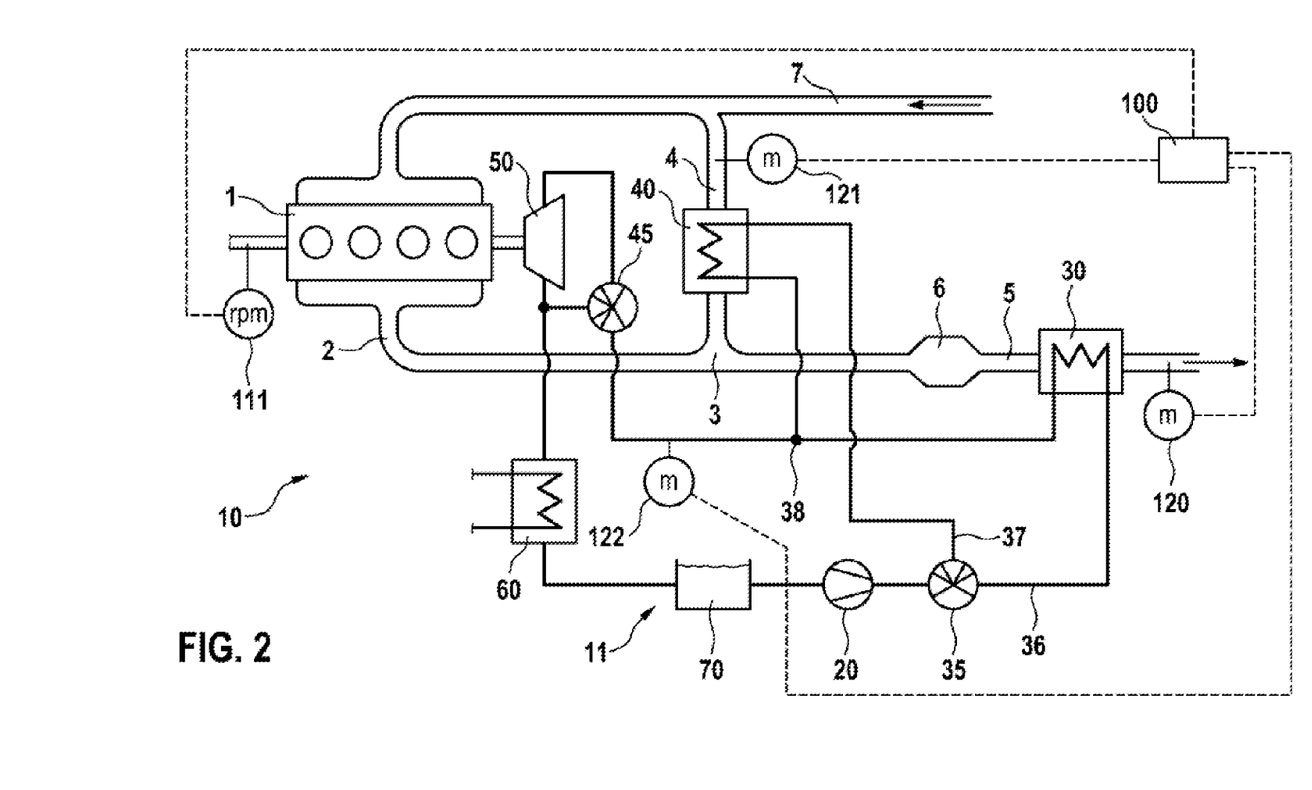
FIG. 2 shows an arrangement for using waste heat of an internal combustion engine with further sensors for determining a leakage of the working medium.
Figure 3:
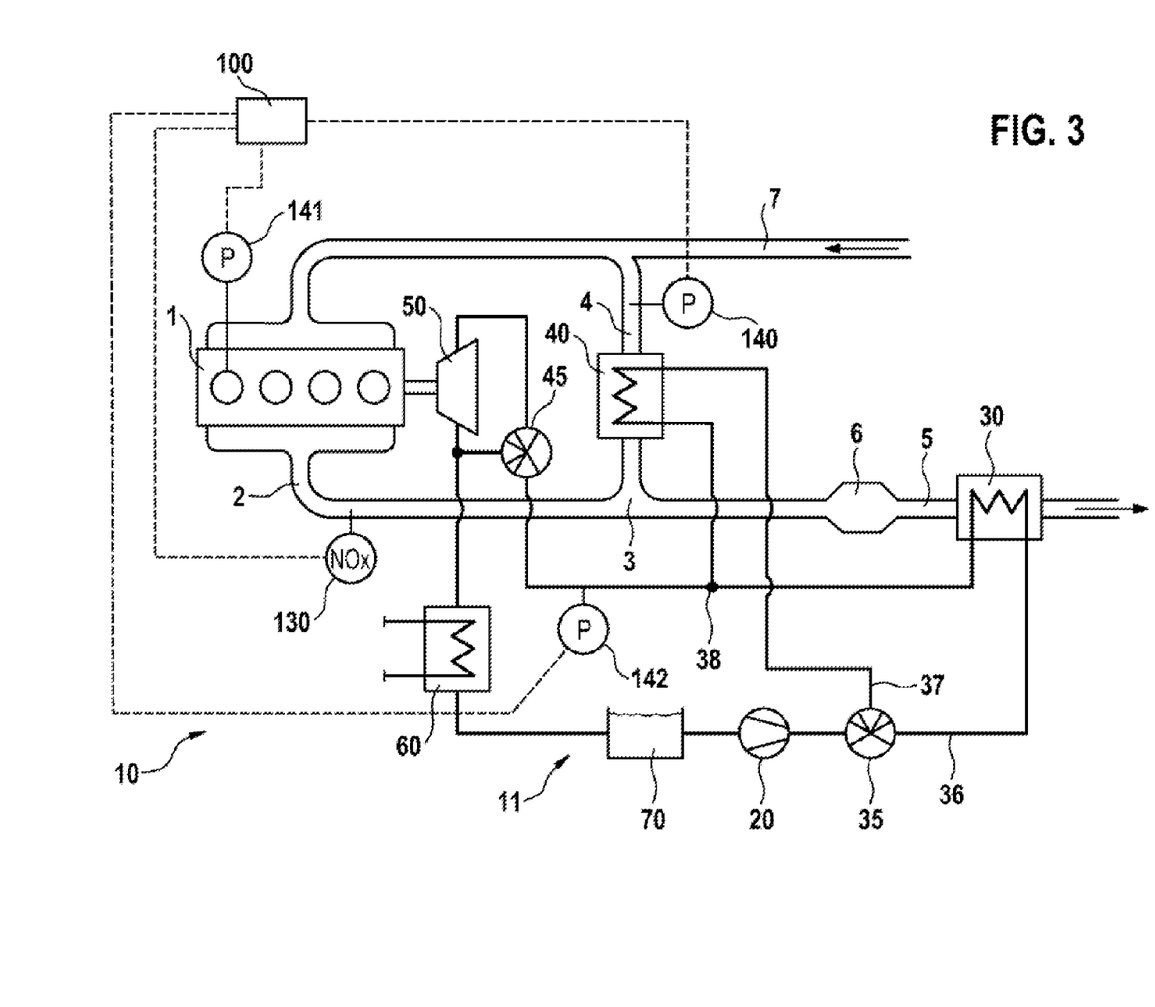
FIG. 3 shows an arrangement for using waste heat of an internal combustion engine with yet further sensors for determining a leakage of the working medium.

According to the invention, one or more sensors for measuring diverse variables are arranged in the circuit 11 and/or in the exhaust gas channel 2, with the aid of which sensors a leakage of the working medium within the evaporators 30, 40 from the circuit 11 into the exhaust gas channel 2 can be detected. FIGS. 1 to 3 here show various sensors for determining the leakage, wherein the signals of the sensors are supplied to a control device 100.

In the figures:
FIG. 1 shows: a first temperature sensor 101 in the circuit 11 between the combining point 38 and the bypass valve 45 for measuring the temperature of the working medium downstream of the evaporators 30, 40; a second temperature sensor 102 in the return channel 4 downstream of the further evaporator 40 for measuring the temperature of the exhaust gas downstream of the further evaporator 40; a third temperature sensor 103 in the exhaust gas channel 2 downstream of the internal combustion engine 1 for measuring the temperature of the exhaust gas downstream of the internal combustion engine 1; a torque sensor 110 on the driven shaft of the internal combustion engine 1 for measuring the torque of the internal combustion engine 1.

FIG. 2 shows: a first mass flow sensor 120 in the end channel 5 downstream of the first evaporator 30 for measuring the exhaust gas mass flow downstream of the first evaporator 30; a second mass flow sensor 121 in the return channel 4 downstream of the further evaporator 40 for measuring the exhaust gas mass flow downstream of the further evaporator 40; a third mass flow sensor 122 in the circuit 11 between the combining point 38 and the bypass valve 45 for measuring the mass flow of the evaporated working medium downstream of the evaporators 30, 40; a rotational speed sensor 111 on the driven shaft of the internal combustion engine 1 for measuring the rotational speed of the internal combustion engine 1.

FIG. 3 shows: an exhaust gas constituent sensor 130 in the exhaust gas channel 2 downstream of the internal combustion engine 1 for measuring the composition of the exhaust gas with respect to nitrogen oxide output and/or soot output and/or hydrocarbon output; a first pressure sensor 140 in the return channel 4 downstream of the further evaporator 40 for measuring the charging pressure downstream of the further evaporator 40; alternatively, the first pressure sensor 140 here can also be arranged in the fresh air channel 7, even upstream of the junction with the return channel 4; a second pressure sensor 141 in the combustion chamber of the internal combustion engine 1 for determining the cylinder pressure in the combustion chamber; a third pressure sensor 142 in the circuit 11 between combining point 38 and bypass valve 45 for measuring the vapor pressure upstream of the bypass valve 45.

The sensors shown in the embodiments of FIGS. 1 to 3 may, of course, also be combined in some other way here. The following generally applies for the determination of the leakage in the evaporators 30, 40: if a greater number of sensors or indicators is used, the determination of the leakage is also more reliable and more accurate. Of course, use may also be made of sensors which sense a plurality of variables (for example pressure and temperature) simultaneously. It is particularly advantageous if use is made of sensors for the determination of leakage that are in any case already arranged in the arrangement for using waste heat or for the operation of the internal combustion engine for the regulation, control or monitoring of other variables; in these cases, the determination of leakage can be carried out without additional costs.

Furthermore, the sensors mentioned can also be used in such a manner that alternative variables are determined therewith. For example it is possible, instead of an exhaust gas mass flow, also to measure an exhaust gas volumetric flow or a pressure which is subsequently converted by the control device 100 into an exhaust gas mass flow. In order to determine the composition of the exhaust gas, use can also be made as exhaust gas constituent sensor 130 of a lambda probe which measures the residual oxygen content in the exhaust gas. If leakage of the working medium, for example ethanol, is combusted in the internal combustion engine, the residual oxygen content in the exhaust gas drops. In this case, the lambda probe is a direct indicator of a leakage.

According to the invention, the following indicators are used for a leakage of the working medium within the evaporators 30, 40 into the exhaust gas channel:

Determining the temperature of the working medium downstream of the evaporators 30, 40, for example by the first temperature sensor 101: if the determined temperature is higher than a value calculated for this purpose, this is an indicator of leakage within the evaporators 30, 40 since the available quantity of heat of the exhaust gas in the evaporators 30, 40 is supplied to a smaller quantity of the working medium than expected. This indicator applies both to the evaporator 30 and to the further evaporator 40.

Determining the exhaust gas temperature in the return channel 4 downstream of the further evaporator 40, for example by the second temperature sensor 102: if the determined temperature is lower than a value calculated for this purpose, this is an indicator of leakage within the further evaporator 40 since comparatively cold working medium mixes with the exhaust gas and cools the latter. However, in an alternative variant, it is also an indicator of leakage if the determined temperature is higher than a value calculated for this purpose since, because of the low mass flow of working medium, only a comparatively low thermal power is extracted from the exhaust gas. These indicators apply only to the further evaporator 40.

Determining the exhaust gas temperature in the exhaust gas channel 2 downstream of the internal combustion engine 1, for example by the third temperature sensor 103: if the determined temperature is higher than a value calculated for this purpose, this is an indicator of leakage within the evaporator 40 if the working medium is combustible, since the working medium in the internal combustion engine 1 is ignited and thereby releases thermal energy. This indicator applies only to the further evaporator 40 since the leakage of the working medium in this case has to be supplied to the internal combustion engine.

Determining the charging pressure in the return channel 4 downstream of the further evaporator 40, for example by the first pressure sensor 140: if the determined pressure is higher than a value calculated for this purpose, this is an indicator of leakage within the further evaporator 40 if a higher pressure prevails in the circuit 11 within the further evaporator 40 than in the return channel 4. This indicator applies only to the further evaporator 40.

Determining the cylinder pressure in the combustion chamber of the internal combustion engine 1, for example by the second pressure sensor 141: if the determined pressure is higher than a value calculated for this purpose, this is an indicator of leakage within the further evaporator 40 if the working medium is combustible and the temperature in the combustion chamber is high enough for burning the working medium, since the working medium in the internal combustion engine 1 is ignited and, as a result, additional pressure arises in the combustion chamber. This indicator applies only to the further evaporator 40.

Determining the vapor pressure of the evaporated working medium in the circuit 11 downstream of the evaporators 30, 40, for example by the third pressure sensor 142: if the determined pressure is lower than a value calculated for this purpose, this is an indicator of leakage within the evaporators 30, 40 if a higher pressure prevails in the circuit 11 downstream of the evaporators 30, 40 than in the exhaust gas channel 2, since the leakage point acts as a type of throttle in to the exhaust gas channel 2 and accordingly the pressure in the circuit 11 is reduced. This indicator applies both to the evaporator 30 and to the further evaporator 40.

Determining the exhaust gas mass flow in the exhaust gas channel 2 downstream of the evaporators 30, 40, for example by the first mass flow sensor 120 for the first evaporator 30 or by the second mass flow sensor 121 for the further evaporator 40: if the determined mass flow is greater than a value calculated for this purpose, this is an indicator of leakage within the evaporators 30, 40, since additional mass enters the exhaust gas channel 2 together with the working medium of the leakage. This indicator applies both to the evaporator 30 and to the further evaporator 40.

Determining the mass flow of the evaporated or else of the still-liquid working medium in the circuit 11 downstream of the evaporator 30, 40, for example by the third mass flow sensor 122: if the determined mass flow is lower than a value calculated for this purpose, this is an indicator of leakage within the evaporator 30, 40, since mass escapes from the circuit 11 together with the working medium of the leakage. This indicator applies both to the evaporator 30 and also to the further evaporator 40.

Determining the composition of the exhaust gas in the exhaust gas channel 2, for example by the exhaust gas constituent sensor 130 which can also be a lambda probe; alternatively, use can also be made of sensors which are arranged in the exhaust gas aftertreatment system 6. However, in both cases, the chemical constituents of the working medium have to be examined more accurately. Depending on the working medium, for example, an exhaust gas nitrogen content value which is determined to be higher or lower than the anticipated value can be an indicator of leakage within the further evaporator 40. If the combusted working medium contains nitrogen, the nitrogen content in the case of a leakage will then higher than anticipated. By contrast, if the working medium in the internal combustion engine 1 is not combusted, the nitrogen content in the case of a leakage will then lie below an anticipated value. Furthermore, the residual oxygen content of the exhaust gas can also be determined: a lower determined value of residual oxygen content is an indicator of leakage if the working medium leakage in the internal combustion engine is combusted. These indicators apply only to the further evaporator 40.

Determining the torque of the internal combustion engine 1, for example by the torque sensor 110: if the determined torque is greater than a torque calculated for this purpose, this is an indicator of leakage within the further evaporator 40 into the return channel 4 if the working medium is combustible and is ignited in the internal combustion engine. However, the self-igniting temperature of the working medium also has to be taken into consideration here: this is because, if the combustion of the working medium takes place, for example, very early in the compression phase, it could namely result in what is referred to as knocking and therefore even in a drop in torque. In order to determine this, use can advantageously also be made of knock sensors. If the determined torque of the internal combustion engine is lower than a torque calculated for this purpose, this can also be an indicator of leakage within the first evaporator 30 into the end channel 5, since less working medium is then evaporated in the first evaporator, which working medium can subsequently be provided to the expansion machine 50. These indicators apply both to the evaporator 30 and to the further evaporator 40, but with the described different effects on the torque.

Determining the rotational speed of the internal combustion engine 1, for example by the rotational speed sensor 111: if the determined rotational speed is greater than a value calculated for this purpose, this is an indicator of leakage within the further evaporator 40 if the working medium is combustible and is combusted in a comparatively late stage of the compression stroke; the combustion of the working medium then has an accelerating effect on the internal combustion engine 1. If the determined rotational speed is lower than a value calculated for this purpose, this is an indicator of leakage within the further evaporator 40, if the working medium is combustible and is combusted at a comparatively early stage of the compression stroke; the combustion of the working medium then acts in a braking manner on the internal combustion engine 1. This indicator applies only to the further evaporator 40.

The invention claimed is:

1. A method for operating an arrangement for using waste heat (10) of an internal combustion engine (1), wherein the internal combustion engine (1) has an exhaust gas channel (2), and the arrangement for using waste heat (10) has a circuit (11) conducting a working medium, wherein a pump (20), at least one evaporator (30, 40), an expansion machine (50) and a condenser (60) are arranged in a direction of flow of the working medium in the circuit (11), wherein the at least one evaporator (30, 40) is also arranged in the exhaust gas channel (2), and wherein, in the at least one evaporator (30, 40), an exhaust gas output by the internal combustion engine is used as a heat source, and the working medium is thereby evaporated in the at least one evaporator (30, 40), the method comprising determining a leakage of the working medium within the at least one evaporator (30, 40) into the exhaust gas channel (2) from a measured physical value, characterized in that the leakage is determined by measuring a mass flow of the exhaust gas in the exhaust gas channel (2) downstream of the at least one evaporator (30, 40), and comparing said mass flow with a calculated mass flow.

2. The method as claimed in claim 1, characterized in that the leakage is determined by measuring a temperature of the working medium in the circuit (11) downstream of the at least one evaporator (30, 40), and comparing said temperature with a calculated temperature.

3. The method as claimed in claim 1, wherein the exhaust gas channel (2) has a return channel (4), wherein the exhaust gas in the return channel (4) is supplied to the internal combustion engine (1), and wherein the at least one evaporator (40) is arranged in the return channel (4), characterized in that an exhaust gas temperature in the return channel (4) downstream of the at least one evaporator (40) is measured, and said exhaust gas temperature is compared with a calculated temperature.

4. The method as claimed in claim 1, wherein the exhaust gas channel (2) has a return channel (4), wherein the exhaust gas in the return channel (4) is supplied to the internal combustion engine (1), and wherein the at least one evaporator (40) is arranged in the return channel (4), characterized in that a charging pressure in the return channel (4) downstream of the at least one evaporator (40) is measured, and said charging pressure is compared with a calculated charging pressure.

5. The method as claimed in claim 1, wherein the exhaust gas channel (2) has a return channel (4), wherein the exhaust gas in the return channel (4) is supplied to the internal combustion engine (1), and wherein the at least one evaporator (40) is arranged in the return channel (4), characterized in that the exhaust gas composition with respect to nitrogen oxide output and/or residual oxygen content and/or soot output and/or hydrocarbon output in the exhaust gas channel (2) downstream of the internal combustion engine (1) is measured, and said exhaust gas composition is compared with a calculated exhaust gas composition.

6. The method as claimed in claim 5, wherein the exhaust gas composition is determined by a lambda probe arranged in the exhaust gas channel.

7. The method as claimed in claim 1, wherein the exhaust gas channel (2) has a return channel (4), wherein the exhaust gas in the return channel (4) is supplied to the internal combustion engine (1), and wherein the at least one evaporator (40) is arranged in the return channel (4), characterized in that a torque of the internal combustion engine (1) is measured, and said torque is compared with a calculated torque.

8. The method as claimed in claim 1, wherein the exhaust gas channel (2) has a return channel (4), wherein the exhaust gas in the return channel (4) is supplied to the internal combustion engine (1), and wherein the at least one evaporator (40) is arranged in the return channel (4), characterized in that a rotational speed of the internal combustion engine (1) is measured, and said rotational speed is compared with a calculated rotational speed.

9. The method as claimed in claim 8, wherein the rotational speed of the internal combustion engine (1) is lower than the calculated rotational speed, characterized in that a control device (100) detects the leakage if combustion of the working medium in the internal combustion engine (1) takes place at an early stage of the compression stroke.

10. The method as claimed in claim 8, wherein the rotational speed of the internal combustion engine is greater than the calculated rotational speed, characterized in that a control device (100) detects the leakage if combustion of the working medium in the internal combustion engine takes place at a late stage of the compression stroke.

11. The method as claimed in claim 1, wherein the exhaust gas channel (2) has a return channel (4), wherein the exhaust gas in the return channel (4) is supplied to the internal combustion engine (1), wherein the at least one evaporator (40) is arranged in the return channel (4), and wherein the internal combustion engine (1) has a combustion chamber, characterized in that a cylinder pressure in the combustion chamber is measured, and said cylinder pressure is compared with a calculated cylinder pressure.

12. The method as claimed in claim 1, wherein the exhaust gas channel (2) has an end channel (5), wherein the exhaust gas in the end channel (5) is output into the surroundings, and wherein the at least one evaporator (30) is arranged in the end channel (5), characterized in that a torque of the internal combustion engine (1) is measured, and said torque is compared with a calculated torque.

13. A method for operating an arrangement for using waste heat (10) of an internal combustion engine (1), wherein the internal combustion engine (1) has an exhaust gas channel (2), and the arrangement for using waste heat (10) has a circuit (11) conducting a working medium, wherein a pump (20), at least one evaporator (30, 40), an expansion machine (50) and a condenser (60) are arranged in a direction of flow of the working medium in the circuit (11), wherein the at least one evaporator (30, 40) is also arranged in the exhaust gas channel (2), and wherein, in the at least one evaporator (30, 40), an exhaust gas output by the internal combustion engine is used as a heat source, and the working medium is thereby evaporated in the at least one evaporator (30, 40), the method comprising determining a leakage of the working medium within the at least one evaporator (30, 40) into the exhaust gas channel (2) from a measured physical value, wherein the exhaust gas channel (2) has a return channel (4), wherein the exhaust gas in the return channel (4) is supplied to the internal combustion engine (1), wherein the at least one evaporator (40) is arranged in the return channel (4), and wherein a rotational speed of the internal combustion engine (1) is measured, and said rotational speed is compared with a calculated rotational speed and determined to be lower than the calculated rotational speed, and wherein a control device (100) detects the leakage if combustion of the working medium in the internal combustion engine (1) takes place at an early stage of the compression stroke.

14. A method for operating an arrangement for using waste heat (10) of an internal combustion engine (1), wherein the internal combustion engine (1) has an exhaust gas channel (2), and the arrangement for using waste heat (10) has a circuit (11) conducting a working medium, wherein a pump (20), at least one evaporator (30, 40), an expansion machine (50) and a condenser (60) are arranged in a direction of flow of the working medium in the circuit (11), wherein the at least one evaporator (30, 40) is also arranged in the exhaust gas channel (2), and wherein, in the at least one evaporator (30, 40), an exhaust gas output by the internal combustion engine is used as a heat source, and the working medium is thereby evaporated in the at least one evaporator (30, 40), the method comprising determining a leakage of the working medium within the at least one evaporator (30, 40) into the exhaust gas channel (2) from a measured physical value, wherein the exhaust gas channel (2) has a return channel (4), wherein the exhaust gas in the return channel (4) is supplied to the internal combustion engine (1), wherein the at least one evaporator (40) is arranged in the return channel (4), and wherein a rotational speed of the internal combustion engine (1) is measured, and said rotational speed is compared with a calculated rotational speed and determined to be greater than the calculated rotational speed, and wherein a control device (100) detects the leakage if combustion of the working medium in the internal combustion engine (1) takes place at a late stage of the compression stroke.

* * * * *